June 3, 1930.                    C. H. MILLER                    1,761,676
                                 CHAIN FASTENER
                               Filed May 18, 1929
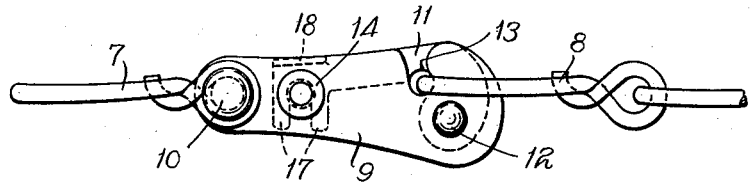
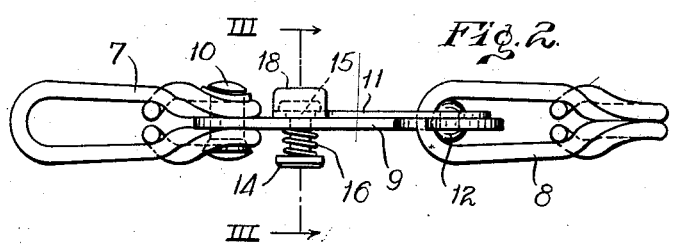
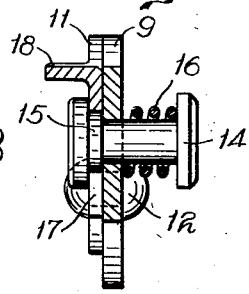
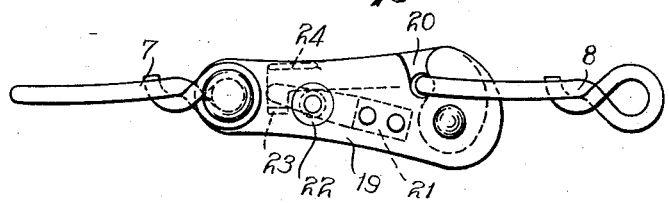
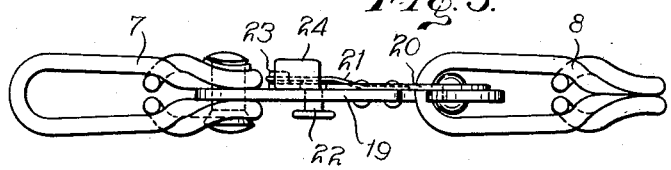
INVENTOR
Charles H. Miller,
By Archworth Martin,
Attorney.

Patented June 3, 1930

1,761,676

UNITED STATES PATENT OFFICE

CHARLES H. MILLER, OF YORK, PENNSYLVANIA, ASSIGNOR TO UNITED STATES CHAIN & FORGING COMPANY, OF PITTSBURGH, PENNSYLVANIA, A CORPORATION OF DELAWARE

CHAIN FASTENER

Application filed May 18, 1929. Serial No. 364,075.

My invention relates to chain fasteners, and more particularly to tightening and connecting devices such as are employed in fastening the side chains of anti-skid chain structures that are employed on automobile wheels, but it is capable of use in various other relations.

One object of my invention is to provide a fastener that is less likely to become accidentally disconnected than various types heretofore employed, and which may nevertheless be conveniently operated to open and close the same.

Still another object of my invention is to provide a fastening device of generally improved form.

Some of the forms which my invention may take are shown in the accompanying drawing, wherein Figure 1 is a side elevational view of one form of fastening device; Fig. 2 is a plan view thereof; Fig. 3 is a view, on an enlarged scale, taken on the line III—III of Fig. 2; Fig. 4 shows a modification of the device of Fig. 1 in side elevation, and Fig. 5 is a plan view of the structure of Fig. 4.

Referring now to Figs. 1 to 3, I show the fastening device as connected to chain links 7 and 8 which may represent the end links of a side chain for automobiles or the like. A connector bar 9 is secured at its forward end to the link 7 by means of a pin or rivet 10. A latch lever 11 is pivotally connected at 12 to the bar 9, the rear end of the bar 9 being provided with a link-receiving recess 13 and the lever 11 serving, when swung from an open position to the closed position of Fig. 1, to draw the link 8 into the recess 13, in a manner well-known in the art.

The bar 9 carries a locking pin 14 that extends therethrough and has an annular shoulder 15 intermediate its ends that is of greater diameter than the hole in the bar 9 through which the shank of the pin extends. A spring 16 normally holds the shoulder 15 in abutting engagement with one side of the bar 9.

The lever 11 is provided with a curved recess near its forward end and with two tongues 17, the distance between the tongues being slightly less than the diameter of said recess. The radius of said recess is substantially equal to the radius of the shoulder 15 of the pin 14, so that such shoulder may fit within the recess and the lever thereby retained against movement radially of the pin 14, by reason of the contraction between the tongues 17.

When the lever 11 is being swung from open position to its closed position, the pin 14 is depressed against the spring 16 to move the shoulder 15 away from the side of the bar 9, so that the legs 17 may pass along the inner surface of the shoulder 15 and straddle the shank of the pin 14. Thereupon the pin 14 is released and the shoulder 15 will be moved, by action of the spring 16, into the curved recess in the lever 11. The lever is thus securely locked against accidental opening movement.

In order to open the fastener, the pin 17 is depressed against the spring 16 and the lever 11 swung in a clockwise direction, to permit removal of the link 8 from the recess 13. The lever 11 is provided with a laterally-extending lip 18 to permit of more convenient manipulation thereof.

Referring now to Figs. 4 and 5, the fastening device comprises a connecter bar 19 and a lever 20. The bar 19 is of substantially the same form as the bar 9 but has a leaf spring 21 riveted to one side thereof and carries a pin 22 which extends through the bar and has connection with the spring 21. Upon depression of the pin 22 at one side of the bar, the spring 21 at the other side of the bar is flexed in a lateral direction away from the bar.

The lever 20 is employed to draw the link 8 into its seat on the connecting bar as in the case of the lever 11, and is provided with a laterally-extending lip 23 at its lower edge and with a flange or thumb piece 24 at its upper edge.

When the lever 20 is being moved to its closed position, the head of the pin 22 is pressed against the side of the bar 19, thus flexing the spring 21 outwardly and permitting the lip 23 to pass the same. Thereupon the pin 22 is released and the spring 21 returns to its normal position, above the lip 23, thus securely holding the lever 20 in closed position. In order to release the link 8, the pin 22 is depressed and the lever 20 grasped by the thumb piece 24 and swung in a clockwise direction.

I claim as my invention:—

1. A fastener comprising a connecter bar, a lever pivotally mounted on said bar, a pin extending through said bar, a spring for holding one end of the pin in laterally spaced relation to one side of the bar, a shoulder adjacent to the opposite end of the pin, a depending tongue portion carried by the forward end of the lever and terminating at its upper end in a shoulder, the last-named shoulder being so arranged as to pass behind the first-named shoulder when the pin is depressed against the said spring and to lie beneath said shoulder when said pin is released.

2. A fastener comprising a connecter bar, a lever pivotally mounted on said bar, a pin extending through said bar, a spring for holding one end of the pin in laterally-spaced relation to one side of the bar, a shoulder adjacent to the opposite end of the pin, a depending tongue portion carried by the forward end of the lever and terminating at its upper end in a shoulder, the said shoulder being so arranged as to pass behind the first-named shoulder when the pin is depressed against the side spring and to lie beneath said shoulder when said pin is released, the shoulder on the pin being of such diameter that it will not pass through the said bar.

3. A fastener comprising a connecter bar, a lever pivotally mounted on said bar, a pin extending through said bar, a spring for holding one end of the pin in laterally-spaced relation to one side of the bar, a shoulder adjacent to the opposite end of the pin, a pair of depending tongues carried by the lever and spaced apart a distance less than the distance of said shoulder, a curved recess being formed in the lever at the upper ends of the tongues, of greater diameter than the distance between the said tongues, but of a diameter approximately equal to that of the said shoulder, and the pin being depressible to permit the tongues to pass between the shoulder and the adjacent side of the bar.

4. A fastener comprising a connecter member, a lever member pivotally mounted on said connecter member, a pin carried by one of said members, a shoulder carried by the other member in position to have interlocking engagement with said pin when the said members are in closed position, and means for yieldably maintaining the pin in operative position, the pin having one end extending beyond the side of its supporting member whereby it may be depressed against the said yieldable means to move it to inoperative position.

In testimony whereof I, the said CHARLES H. MILLER, have hereunto set my hand.

CHARLES H. MILLER.